United States Patent [19]

Georgacopoulos et al.

[11] 4,381,364

[45] Apr. 26, 1983

[54] FLAME RETARDANT TERTIARY POLYMER BLEND

[75] Inventors: Costas N. Georgacopoulos, Berlin; Curtis P. Smith, Cheshire, both of Conn.

[73] Assignee: The Upjohn Company, Kalamazoo, Mich.

[21] Appl. No.: 387,799

[22] Filed: Jun. 14, 1982

[51] Int. Cl.³ .................... C08K 5/06; C08L 75/06; C08L 75/08
[52] U.S. Cl. .................... 524/373; 524/411; 524/412; 525/125
[58] Field of Search .......... 524/375, 507, 411, 412; 525/125, 129, 233; 521/137

[56] References Cited

U.S. PATENT DOCUMENTS

| | | | |
|---|---|---|---|
| 3,075,928 | 1/1963 | Lanham | 521/137 |
| 3,350,332 | 10/1967 | Hardy et al. | 525/129 |
| 3,350,333 | 10/1967 | Beer et al. | 525/129 |
| 3,644,578 | 2/1972 | Mathieu et al. | 525/233 |
| 3,678,129 | 6/1972 | Fischer | 525/125 |
| 3,970,716 | 7/1976 | Evers et al. | 524/169 |
| 3,993,607 | 11/1976 | Florence | 525/233 |
| 4,016,139 | 4/1977 | Anderson et al. | 524/373 |
| 4,028,336 | 6/1977 | Anderson | 524/373 |
| 4,089,911 | 5/1978 | Itoh et al. | 524/507 |

FOREIGN PATENT DOCUMENTS 244721 1/1961 Australia .
1101665 1/1968 United Kingdom .

OTHER PUBLICATIONS

M. T. Shaw: "Processing and Commercial Application of Polymer Blends," Polymer Engineering and Science, Mid-Feb., 1982, vol. 22, No. 2, pp. 115-123.

*Primary Examiner*—V. P. Hoke
*Attorney, Agent, or Firm*—James S. Rose; Denis A. Firth

[57] ABSTRACT

Thermoplastic compositions are disclosed which comprise blends of about 50 to about 85 percent by weight of a thermoplastic polyurethane and the balance of the blend comprising (a) a polyvinyl halide resin and (b) a diene-nitrile copolymer rubber, the weight ratio of (a) to (b) being within the range of from about 1:4 to about 1.5:1.

The novel blends do not melt or spread flaming drip when combusted but rather form chars. The blends are optionally fire retarded by the addition of flame retardants.

The fire retarded blends find utility in, inter alia, electric wire and cable jacketing where a high degree of fire retardance is required. The blends without fire retardants provide a good thermoplastic polyurethane at lower cost than the polyurethanes alone and find utility in those applications normally associated with polyurethanes such as films, footwear, wire jacketing, and particularly those applications calling for a higher degree of oil resistance than polyurethanes alone.

15 Claims, No Drawings

FLAME RETARDANT TERTIARY POLYMER BLEND

BACKGROUND OF THE INVENTION

1. Field of the Invention

This invention relates to thermoplastic compositions and is more particularly concerned with thermoplastic polymer blends comprising predominantly polyurethane elastomers and fire retardant compositions derived therefrom.

2. Description of the Prior Art

Many types of blends of thermoplastic polyurethane polymers with other thermoplastic polymers have been utilized to overcome some deficiency in properties in either the polyurethane itself or in the other ingredient(s).

For example, the low temperature properties of vinyl chloride polymers (PVC) can be improved by blending them with polyurethanes as typically disclosed in U.S. Pat. No. 3,257,261. Multicomponent blends like those derived from polyurethanes, PVC resins, and chlorinated polyethylene (CPE) disclosed in U.S. Pat. No. 3,882,191 have been employed to improve processing characteristics while at the same time providing economically attractive products. Other similar blends are disclosed in U.S. Pat. Nos. 3,381,056 and 4,111,894.

U.S. Pat. No. 3,970,716 discloses fire retardant blends consisting of thermoplastic polyurethanes, chlorinated polyethylenes, and a narrow group of chlorine containing fire retardant materials. The disclosed blends are characterized by the highest self extinguishing (SE) rating of SE-O when tested by the Underwriters Laboratory (UL) test designated UL 94 (test defined below). However, chlorinated polyethylenes do not stand up well to the high processing temperatures met in some injection molding procedures. This results in the blend tending to degrade with overall loss in polymer properties.

British Pat. No. 1,101,665 discloses adhesive compositions of organic solutions consisting of polyesterurethanes, butadiene acrylonitrile copolymers and vinyl chloride-vinyl acetate copolymers.

U.S. Pat. No. 3,678,129 discloses thermoplastic polymer blends of predominantly polyvinyl chloride mixed with minor amounts of a polyether polyurethane and butadiene-acrylonitrile copolymers. The latter two ingredients give rise to improved abrasion resistance of the polyvinyl chloride.

We have now discovered that blends of thermoplastic polyurethanes with polyvinyl halide resins and diene-nitrile copolymer rubbers in proportions heretofore not taught by the prior art provide thermoplastic polymers having unique and unexpected char forming properties when the blends are subjected to flame tests. This ready formation of a char upon combustion has not hitherto been observed for polyurethane polymers alone.

In contrast to pure PVC and blends rich in PVC which burn with the evolution of much dense black smoke, including those PVC blends described in U.S. Pat. No. 3,678,129 cited supra, the present blends do not evolve dense black smoke when forming the char.

Furthermore, standard fire retardant additives can be added into the present blends to impart increased resistance to burning including fire retardants of the type which have been taught by U.S. Pat. No. 3,970,716 as not being useful in preventing flaming drip of polyurethanes. Also the present blends do not suffer any of the high temperature processing problems referred to above for the prior art blends disclosed in U.S. Pat. No. 3,970,716.

Additionally, the physical properties of the present polymer blends including those with the fire retardant additives retain, to a major extent, the good properties of the original polyurethanes.

SUMMARY OF THE INVENTION

This invention comprises a thermoplastic composition comprising a blend of about 50 to about 85 percent by weight of a thermoplastic polyurethane and the balance of the blend comprising (a) a polyvinyl halide resin and (b) a diene-nitrile copolymer, the weight ratio of (a) to (b) being within the range of from about 1:4 to about 1.5:1.

This invention also comprises the above compositions additionally containing fire retardant additives.

The thermoplastic compositions in accordance with the present invention can be used as tubing, wire and cable jacketing, footwear, animal tags, and those applications calling for a higher degree of oil resistance than that of normal polyurethanes such as for the soles and heels of work boots, aprons, and the like.

The fire retarded polyurethanes of the invention easily pass the Underwriters Laboratory UL 94 fire test (test defined below) with the highest non-burning rating. These materials can be used as jacketing material for electric wires and cables and hydraulic lines that are exposed to high-risk and inaccessible environments such as utility tunnels in ships, aircraft, subways, large public buildings, and the like where a high degree of fire retardance is required. The present compositions can also be used in film and sheeting form or as fabric coating in upholstery applications where fire retardancy is essential such as in aircraft and automobile seating.

DETAILED DESCRIPTION OF THE INVENTION

Generally speaking, the thermoplastic blend compositions in accordance with the present invention have the balance of 50 to 15 percent by weight made up of the polyvinyl halide (a) and diene-nitrile copolymer (b) in the weight ratios also set forth above. However, this is not to say that minor proportions of additional components cannot be present so long as the polyurethane and the (a) and (b) components fall within the weight percent ranges set forth above and so long as the presence of any additional components does not interfere with the char forming properties of the present compositions.

Preferably, the blends contain about 65 to about 85 percent by weight of a thermoplastic polyurethane and about 35 to about 15 percent by weight of (a) and (b) in the weight ratios defined above. Most preferably, the polyurethane is from about 70 to about 80 percent by weight with the (a) and (b) combination being 30 to 20 percent by weight.

The weight ratios of (a) to (b) are preferably from about 1:3 to about 1.22:1 and most preferably from about 1:3 to about 1:1.

The polyurethanes which can be employed in the present blends can be any of the conventional elastomeric thermoplastic polyurethanes known in the art, particularly those polyurethanes falling within a hardness range of about 65 Shore A to 70 Shore D. These include those polyurethanes which are generically known as polyether and polyester polyurethanes and which are prepared from a wide variety of polyols, diisocyanates, and extenders. The present blends also contemplate the use of mixtures of polyester and polyether polyurethanes in any proportion.

In the main, typical polyurethanes are commercially available from a number of suppliers. For methods and procedures and components for preparing typical thermoplastic polyether and polyester polyurethanes which can be employed in the present blends see U.S. Pat. Nos. 3,493,634; 3,642,964; 4,169,196 and 4,202,957; and Polyurethane Technology, edited by P. F. Bruins, Interscience Publishers, 1969, New York, N.Y., Chapter 10, pp 197-214, entitled Polyurethane Thermoplastics by C. S. Schollenberger; the disclosures of the above patents being incorporated herein by reference.

The preferred thermoplastic polyurethanes for use in the present blends are prepared by the reaction of 4,4'-methylenebis (phenyl isocyanate) with a polymeric diol and diol extender wherein the polymeric diol advantageously has a molecular weight (MW) within the range of 400 to 4000 and is selected from a polyester diol, such as a polyalkylene ester diol, polyoxyalkylene ester diol, polyoxyalkanoyl diol, and the like; a polyoxypropylene-polyoxyethylene copolymer diol, a polytetramethylene ether glycol, and the like; and the diol extender is selected from aliphatic straight chain diols having 2 to 6 carbon atoms, inclusive, bis(2-hydroxyethyl)ether of hydroquinone, and those extender mixtures wherein up to 25 percent of the above described extenders are replaced by a diol selected from the group consisting of branch chain aliphatic diols from 3 to 6 carbon atoms, diethylene glycol, dipropylene glycol, and polyethylene glycols having a molecular weight from 200 to 600.

The polyvinyl halide resin (a) can be any polyvinyl halide resin well known to those skilled in the art such as polyvinyl chloride and polyvinyl fluoride. Preferably (a) is polyvinyl chloride (PVC) and can be any of the varieties of PVC well known to those skilled in the art. The molecular weight range of the polyvinyl halide is in no way critical and can fall within a broad range but preferably within a number average molecular weight range of about 50,000 to about 200,000.

The diene-nitrile rubber (b) is an uncured rubbery copolymer and can be any of the rubbers well known to those skilled in the art as diene-nitrile rubbers and prepared from an aliphatic hydrocarbon diene and a polymerizable aliphatic nitrile monomer.

The term "aliphatic hydrocarbon diene" means an aliphatic hydrocarbon conjugated diene having 4 to 8 carbon atoms, inclusive, such as 1,3-butadiene, 2-methyl-1,3-butadiene, 2,3-dimethyl-1,3-butadiene, 2-ethyl-1,3-butadiene, and 2,3-diethyl-1,3-butadiene. The aliphatic hydrocarbon diene can be substituted by halogens (fluorine, chlorine, bromine, or iodine with chlorine preferred), such as 2-chloro-1,3-butadiene, 2,3-dichloro-1,3-butadiene, and the like.

A preferred diene is 1,3-butadiene.

The term "aliphatic nitrile monomer" means a polymerizable olefinic monomer having 2 to 6 carbon atoms, inclusive, in the aliphatic radical, such as acrylonitrile, methacrylonitrile, ethacrylonitrile, propacrylonitrile, and butacrylonitrile. The aliphatic group can be substituted by halogens (as defined above) with chlorine preferred, such as chloroacrylonitrile.

A preferred aliphatic nitrile is acrylonitrile.

The diene-nitrile rubber can be prepared from a single diene monomer species with a single nitrile monomer species or mixtures of diene and/or nitrile. Advantageously, the proportions of the respective monomers fall within a range of from about 50 to about 95 percent by weight diene and about 5 to about 50 percent by weight nitrile, preferably about 60 to 80 and 20 to 40 weight percent respectively.

As noted previously, the diene-nitrile rubbers (NBR) are commercially available. Alternatively, they are easily prepared by the emulsion polymerization of the reactants in water at about 30° to about 60° C. in closed reactors free of air and in the presence of emulsifying agents and free radical initiators at typical reaction periods of 6 to 24 hours. For typical preparative methods see Preparative Methods of Polymer Chemistry by W. R. Sorenson and T. W. Campbell, pp 218 to 220, 1961, Inter-Science Publishers, New York, N.Y.

Surprisingly, the blends of the thermoplastic polyurethanes with the polyvinyl halides and diene-nitrile rubbers within the proportions defined above provide thermoplastic compositions which upon combustion form a char. Comparatively, polyurethane blends with PVC alone, NBR and other rubbers alone, or even combinations of PVC with other rubbers do not form chars upon burning but produce a molten flaming drip.

Although the blends in accordance with the present invention without additional fire retardants will burn, the formation of chars is of tremendous advantage in obtaining enhanced fire retardancy in thermoplastic polyurethanes.

Additionally, the present blends retain good physical properties characteristic of polyurethanes and behave essentially as themoplastic polyurethanes.

In an added, and, unexpected advantage, the present blends can be manipulated at high processing temperatures such as those encountered in some injection molding operations. In contrast, some of the prior art polyurethane blends, particularly those containing chlorinated polyethylene tend to degrade at processing temperatures as low as 370° F.

In a preferred embodiment of the thermoplastic blends described above a fire retardant additive is also present in an effective amount sufficient to cause the flame of a burning test sample to self-extinguish when the source of ignition is removed. The amount required to achieve this result will vary considerably depending on the type and/or combination of types of flame retardants employed. One skilled in the art can easily determine the effective amount by trial and error. For example, small samples of the molded or extruded pieces of the blends containing the fire retardants in varying amounts can be exposed to the flame of a bunsen burner or small propane torch until combustion occurs then the flame is removed and the sample observed.

The variety and number of flame retardant additives commercially available in the plastics field is very extensive. Any of the fire retardants known to those skilled in the art and which do not degrade the blend components or otherwise detract from the blend physical properties can be employed.

Advantageously, the flame retardant additives comprise combinations of halogenated organic compounds, preferably halogenated aromatics and most preferably brominated aromatics, with inorganic compounds. For a comprehensive review of both types of additives and their use in plastics including polyurethanes see Plastics Compounding, July/August, 1981, pp 89 to 98; and September/October, 1981, pp 95 to 100.

When the above types of combined additives are employed, one skilled in the art can readily determine the effective amount of the total combination to be used in the thermoplastic compositions in accordance with the present invention and the proportions of halogenated to inorganic compound within any given effective amount.

Generally speaking, in order to meet both good physical property requirements and good flame retardancy the combined weight percent of the halogenated organic compound and inorganic compound in the total blend weight falls within the range of about 15 to about 35 percent and preferably 20 to 30 percent.

In respect of the weight ratio of halogenated organic to inorganic, this can vary somewhat depending on the particular choice of components but usually falls within the range of about 1.5:1 to about 3.5:1.

Illustrative, but not limiting, of the halogenated organic compounds are tris(2,3-dibromopropyl)phosphate, tris(1,3-dichloroisopropyl)phosphate, tris-(bromocresyl)phosphate, hexachlorocyclopentadiene, pentabromochlorocyclohexane, hexabromocyclododecane, chlorendic anhydride, 1,2-bis[4,5-dibromo-3,6(dimethylmethano)hexahydrophthalimidyl]ethane; the various hexachlorocyclopentadiene adducts known and used as fire retardants including those disclosed in U.S. Pat. No. 3,970,716 cited supra; 1,2-bis(3,4,5,6-tetrabromophthalimidyl)ethane, tetrabromo-o-chlorotoluene, hexabromobiphenyl, pentachlorobenzene, hexabromobenzene, pentabromodiphenyl oxide, decabromodiphenyl oxide, 2,4,6-tribromophenoxy-2,3-dibromopropane, 2,2-bis[4-(2,3-dibromopropoxy)-3,5-dibromophenyl)]propane, decabromodiphenoxyethane, pentabromoethylbenzene, bis(2,4,6-tribromophenyl)-carbonate, and the like; the chlorinated and brominated polystyrenes; and the like.

Preferred, amongst the above species are the brominated aromatic compounds.

Illustrative, but not limiting, of the inorganic compounds which can be used in combination with the halogenated compounds are antimony oxide, antimony silico-oxide, antimony silicate, zinc borate, ammonium fluoborate, barium metaborate, ammonium polyphosphate, molybdenum phosphite, and the like.

A preferred inorganic compound is antimony oxide.

The most preferred combinations include the aromatic bromine compounds with antimony oxide in the weight ratios in respect of each other and overall weight percent proportions in the blends set forth above.

The blends in accordance with the present invention are very easily prepared and in any sequence desired. For example, they can be prepared at the same time as the polyurethane by bringing together the various ingredients, that is to say, the polyurethane forming ingredients, the polyvinyl halide resin, the diene-nitrile rubber, and fire retardant additive, either in a batch reaction process, or, preferably, in a continuous process using a heated extruder as taught in U.S. Pat. No. 3,642,964 cited supra.

Alternatively, if the fire retarded compositions per se are not required then the above process can be carried out with only the polyvinyl halide resin and rubber along with the polyurethane forming ingredients. The fire retardant additives can be added optionally in a subsequent operation.

Incidentally, and optionally, some of the polyvinyl halide resins and diene-rubbers, particularly polyvinyl chloride, and acrylonitrile/butadiene are commercially available in premixed blends within the weight ratios called for above.

In an optional, and preferred, method the preformed thermoplastic polyurethane, the polyvinyl halide resin, the rubber, and optionally the fire retardant additives are fluxed in any suitable mixing apparatus such as a Banbury type internal mixer, rubber mill, extruder, and the like, at a temperature of from about 330° F. to about 390° F. to form a homogeneous blend. If the fire retardant additives have not been fluxed in at this first stage then they can be added at a later time by fluxing with the already obtained blend of polyurethane/resin/rubber.

If desired, the blends of the invention can have incorporated in them, at any appropriate stage of preparation, additives such as pigments, fillers, lubricants, stabilizers, antioxidants, coloring agents, and the like.

The following examples describe the manner and process of making and using the invention and set forth the best mode contemplated by the inventors of carrying out the invention but are not to be construed as limiting.

EXAMPLE 1

The following polymer blends 1 through 17 were prepared from a preformed polyether polyurethane and the various other ingredients in the proportions by weight set forth in Table I. Blends 1 through 4 are in accordance with the present invention while 5 through 17 are comparison polymer blends.

The polyether polyurethane designated Polyether PU was prepared by reacting a polyol blend comprising a one equivalent proportion of a 1000 MW polytetramethylene glycol, a one equivalent proportion of 1,4-butanediol, a trace of wax lubricant and hindered phenol antioxidant, and stannous octoate (about 0.02% w/w total PU weight) with 4,4'-methylenebis(phenyl isocyanate) at about 1.0 Index. The PU was pelletized, dried, and used in pellet form for the blending experiments.

The polymer blends were prepared by fluxing the pelletized materials through a Brabender twin-screw compounder at about 370° F. to 390° F. The blends were extruded as ¼" diameter strands into cold water. The cooled polymers were chopped into small sized pieces and dried at 170° F. for 2 hours. The dried pieces were then injection molded into 4"×4"×1/16" sheets using a Stubbe injection molding machine operating at a barrel temperature of 360° F.–390° F., 1000 psi injection pressure, cycle time of about 40 seconds, and mold temperature of about 120° F.

The flame resistant properties of the blends were determined by cutting strips measuring 1 inch wide from the sheets, suspending the strips vertically in a clamp and playing the flame from a small propane torch on the bottom of the suspended samples to cause sample ignition. Then the torch was removed to observe the sample. Blends 1 through 4 ignited and burned, however, instead of the polymer showing a flaming drip, a char formed during burning preventing any drip of molten material. When a sample of the straight Polyether PU was tested it ignited and molten flaming polymer ripped from the burning end of the strip.

In order to test other rubbers and PVC by itself, blends 5 through 12 were prepared using the same weight proportions used in blends 1 and 2. All of these samples burned with a flaming drip.

In order to test the effect of other rubbers in combination with the same level of PVC used in blends 1 and 2, blends 13 through 17 were prepared using the combinations set forth in Table I. All of these blends burned with flaming drip.

The molded sheets of blends 1 through 4 were clear to transparent signifying good compatibility between the blended ingredients.

Representative physical properties as measured on a molded sheet of blend 3 were found to be virtually the same as those for the molded neat Polyether PU: 80 Shore A Hardness; Tensile strength=3138 psi; Modulus (psi), 50%=600, 100%=750, 300%=1100; Elongation at break=735%.

A comparison burning test was carried out with PVC compositions prepared according to U.S. Pat. No. 3,678,129 wherein 45.3 g. of PVC pellets (supplied by Ethyl Corp., Baton Rouge, La., under the identification number 7053) were fluxed in the Brabender under the same conditions set forth above with 7.7 g. of dioctyl phthalate as a plasticizer, 7.7 g. of NBR rubber (same as NBR B identified in footnote 1 to Table 1 but containing no PVC), and 7.7 g. of the Polyether PU described above. The 7053 sample of PVC is reported to have a UL 94-VO non-burning rating by the manufacturer (test defined in footnote 4 of Table II below).

The blended polymer was pressed into sheets at 350° F. under 20,000 pounds on a mold measuring 6"×6"×1/16".

A 1" wide strip of the blend was exposed to the propane torch test described above. The sample burned when exposed to the flame but did not drip. However, excessive black soot was produced during the test.

A second PVC blend was prepared similar to the above except that the dioctyl phthalate was eliminated. The pressed sample when exposed to the propane torch burned with the same characteristics as the first sample evolving excessive black soot although not quite as dense as the first sample.

Comparatively, a sample of a polymer blend 1 according to the present invention when subjected to the same torch test shows no excessive smoke given off during ignition.

TABLE I

| Blend | 1 | 2 | 3 | 4 | 5 | 6 | 7 | 8 | 9 |
|---|---|---|---|---|---|---|---|---|---|
| Ingredients (proportions by wt.): | | | | | | | | | |
| Polyether PU | 75 | 75 | 70 | 70 | 75 | 75 | 75 | 75 | 75 |
| NBR A[1] | 17.5 | | | | | | | | |
| NBR B[1] | | 17.5 | | | | | | | |
| NBR C[1] | | | 21 | | | | | | |
| NBR D[1] | | | | 21 | | | | | |
| PVC | 7.5 | 7.5 | 9 | 9 | | | | | |
| EPDM[2] | | | | | 25 | | | | |
| TPR-1922[3] | | | | | | 25 | | | |
| Stereon-830[4] | | | | | | | 25 | | |
| Cis-polybutadiene[5] | | | | | | | | 25 | |
| CPE[6] | | | | | | | | | 25 |
| Observations | burns but no drip, forms char | burns but no drip, forms char | burns but no drip, forms char | burns but no drip, forms char | burns and drips | burns and drips | burns and drips | burns and drips | burns and drips |

| Blend | 10 | 11 | 12 | 13 | 14 | 15 | 16 | 17 |
|---|---|---|---|---|---|---|---|---|
| Ingredients (proportions by wt.): | | | | | | | | |
| Polyether PU | 75 | 75 | 75 | 75 | 75 | 75 | 75 | 75 |
| NBR A[1] | | | | | | | | |
| NBR B[1] | | | | | | | | |
| NBR C[1] | | | | | | | | |
| NBR D[1] | | | | | | | | |
| PVC | 25 | | | 7.5 | 7.5 | 7.5 | 7.5 | 7.5 |
| EPDM[2] | | | | 17.5 | | | | |
| TPR-1922[3] | | | | | | | 17.5 | |
| Stereon-830[4] | | | | | | | | 17.5 |
| Cis-polybutadiene[5] | | | | | 17.5 | | | |
| CPE[6] | | | | | | | | |
| EVA[7] | | 25 | | | | 17.5 | | |
| NBR 130[8] | | | 25 | | | | | |
| Observations | burns and | burns and | burns and | burns and | burns and | burns and | burns and | burns and |

TABLE I-continued

| | drips | drips | drips | drips | drips | drips | drips | drips |
|---|---|---|---|---|---|---|---|---|

Footnotes to TABLE I
[1]NBR A, B, C, and D are four acrylonitrile-butadiene rubbers with A and C additionally containing some carboxylic acid groups and all containing about 34 percent by weight acrylonitrile residues except D which contains about 25 percent by weight acrylonitrile. All samples were supplied by Polysar Ltd., Sarnia, Ontario, Canada in bale form and already preblended with PVC in the same proportions by weight set forth above (i.e. 70/30 by wt. NBR/PVC). The NBR/PVC blends are identified by the tradenames NV 440, Krynac 870/60, XPRD 773, and NV680/98SA respectively. Each sample was chopped into about ⅜" pellets prior to blending with the polyurethane.
[2]EPDM is an ethylene/propylene/diene hydrocarbon rubber supplied by DuPont Co., Wilmington, Del.; Mooney visc. ML$_{(1+4)}$ at 121° C. is 45.
[3]TPR-1922 is an ethylene/propylene rubber of 92 Shore A hardness supplied by Uniroyal Chem., Naugatuck, Conn.
[4]Stereon-830 is a butadiene/styrene rubber (30 percent by wt. bound styrene) supplied by Firestone Tire & Rubber Co., Akron, Ohio.
[5]Cis-polybutadiene rubber, Mooney visc. at 100° C. = 40, supplied by Polysar (cited supra) under the tradename of Taktene 1202.
[6]Chlorinated polyethylene supplied by Dow Chemical, Midland, Mich., % Cl = 42.
[7]Ethylene/vinyl/acrylate rubber supplied by DuPont Chemical, Wilmington, Del., under tradename of Elvaloy 741, MW >250,000.
[8]NBR 130 is identical to the straight NBR D described above.

EXAMPLE 2

Polymer blends 18 through 23 were prepared from the Polyether PU (see example 1) and the various ingredients in the proportions of parts by weight set forth in Table II. The blends were prepared by mixing the ingredients in a Brabender Plasticorder at 60 to 80 r.p.m. at about 360° F.–390° F. for about 5 to 10 minutes to form a blended mass.

Samples of the blended materials were pressed into plaques at a press temperature of about 350° F. and about 20,000 pounds on a mold measuring 3"×5"×¼".

All of the blends contained the same proportions of Polyether PU and the finely divided powdered fire retardant additives set forth in Table II.

Blend 18 was in accordance with the present invention and contained the combination of NBR rubber with PVC. Blends 19 through 23 were prepared for purposes of comparison and contained solely an NBR rubber, or chlorinated polyethylene, or ethylene/propylene rubber, in the same weight proportions as the combined NBR/PVC of blend 18. Blend 23 contained no rubber component.

All samples were tested in the UL 94 vertical burn test defined below and blend 18 received the highest rating of VO which signifies no flaming drip. Blends 19 through 22 did not receive a VO rating and blend 23 when tested by the torch test showed a molten drip when flame was removed.

TABLE II

| Blend | 18 | 19 | 20 | 21 | 22 | 23 |
|---|---|---|---|---|---|---|
| Ingredients (pts. by wt.): | | | | | | |
| Polyether PU | 38 | 38 | 38 | 38 | 38 | 49 |
| NBR E[1] | 5.5 | | | | | |
| PVC | 5.5 | | | | | |
| NBR F[2] | | 11 | | | | |
| NBR G[3] | | | 11 | | | |
| CPE | | | | 11 | | |
| TPR-1922 | | | | | 11 | |
| Decabromodiphenyl oxide | 12 | | | | | 14 |
| Decabromodiphenoxyethane | | 12 | 12 | 12 | 12 | |
| Zinc borate | 2 | 2 | 2 | 2 | 2 | 2.1 |
| Antimony oxide | 7 | 7 | 7 | 7 | 7 | 4.9 |
| Observations | received | no drip | no drip | no drip | no drip | drip |
| | UL 94-VO[4] rating | no VO rating | no VO rating | no VO rating | no VO rating | |

Footnotes to TABLE II
[1]NBR E is an acrylonitrile-butadiene rubber containing about 34 percent by weight acrylonitrile residues and supplied by Polysar (supra) in bale form and preblended with the PVC in the same proportions by weight set forth above (i.e. 50/50) under the tradename Krynac 850.
[2]NBR F is the same acrylonitrile-butadiene rubber described in NBR D above (footnote 1 Table I) but without the PVC.
[3]NBR G is the same acrylonitrile-butadiene rubber described in NBR C above (footnote 1 Table I) but without the PVC.
[4]UL 94-VO is the highest rating for non-burning of plastics when tested in the UL 94 vertical burn test in accordance with the test method described by Underwriters Laboratories, Inc., Northbrook, Illinois. The test specimen measures 5" × ½" × maximum thickness of ⅛". Specimens are conditioned by storage for 48 hours at 23° C. and 50% relative humidity followed by 168 hours at 70° C. then cooled in a desiccator prior to testing.
The specimen is clamped by one end so that it hangs vertically in a draft-free chamber with the lower end suspended 12" above a 2 square inch thin layer of cotton.
A ¾" blue flame of a bunsen burner is held for 10 seconds under the sample then removed and flame duration noted. The flame is placed again for another 10 second period. Specimens are tested in sets of five for each blend. Test observations include duration of flame after first and second flame application, whether sample burns up to the clamp, particularly whether specimen drips flaming particles to ignite the cotton.
To achieve UL 90-VO the specimen must not burn more than 10 seconds after either flame application; total combustion time not to exceed 50 seconds for all 10 applications (5 specimens × 2 flame applications each); no burning up to clamp; no flaming drip or cotton ignition; specimen glow time no more than 30 seconds after removal of second flame.

EXAMPLE 3

Three polymer blends 24 through 26 in accordance with the present invention were prepared using the procedure described in Example 1.

Blend 24 used the same Polyether PU described in Example 1. Blend 25 used a modification of the above PU designated Polyether PU-A. The latter polyurethane differed from the former by containing about twice the level of extender diol relative to the 1000 MW polytetramethylene glycol and was therefore a harder material. Blend 26 was prepared by reacting a glycol blend comprising a one equivalent proportion of an 800 MW polybutylene adipate, a 1.3 equivalent proportion of 1,4-butanediol, a trace of wax lubricant and hindered phenol antioxidant, and stannous octoate catalyst with 4,4'-methylenebis(phenyl isocyanate) at about 1.00 index.

The NBR/PVC blend is the same as the NBR E described in footnote 1 to Table II. The blends were made into three films using a Killion 1" extruder operating at 360°–390° F. at 20 r.p.m. which extruded continuous sheeting about 3½" wide × about 25 mil thickness.

The films were subjected to the physical tests set forth in Table III and all three received the highest non-burning rating in the UL 94-M test defined below. That is to say they showed no drip or flaming drip when burned. They also showed high O.I. (oxygen index) values when tested.

TABLE III

| Blend | 24 | 25 | 26 |
|---|---|---|---|
| Ingredients (pts. by wt.): | | | |
| Polyether PU | 57.14 | | |
| Polyether PU-A | | 57.14 | |
| Polyester PU | | | 62.5 |
| NBR/PVC (50/50 by wt.) | 14.28 | 14.28 | 15.63 |
| Decabromodiphenoxy-ethane | 18.57 | 18.57 | 15.63 |
| Antimony oxide | 10 | 10 | 6.25 |
| Properties: | | | |
| Tensile str. (psi) | 2067 | 3532 | 4117 |
| 50% modulus | 391 | 900 | 1268 |
| 100% modulus | 436 | 968 | 1338 |
| 300% modulus | 521 | 1433 | 2128 |
| Elongation at break, % | 725 | 523 | 493 |
| Tensile set, % | 126 | 78 | 80 |
| UL 94-M[1] | V-T-M-O | V-T-M-O | V-T-M-O |
| Oxygen Index[2] | | 27.9 | 33.3 |

Footnotes to TABLE III
[1]UL 94-M is an adaptation of the UL 94 test described in footnote 4 of Table II for testing polymeric films. The main difference is the sample size and configuration which is an 8" × 2" film formed and held by adhesive into a cylindrical shape. The tubular test specimen is clamped about ¼" from the top end in such a way that the top end of the film cylinder is closed to prevent a chimney effect. The bottom of the cylinder is flared out flat. The flame is applied for two 3 second periods instead of the 10 second periods above and the same observations made as for the UL 94-V test above. In order to receive the maximum fire retardant rating of V-T-M-O, the test specimen shall not ignite the cotton by a flaming drip, no flame more than 10 seconds after the burner flame is removed in each 3 second test, and total combination time not to exceed 50 seconds for all 10 applications (5 specimens × 2 flame applications).
[2]Oxygen Index is a flammability test in accordance with the ASTM D-2863 procedure and reported as the percent oxygen required to sustain sample combustion.

Repetition of blends 24 and 26, except that the blending was carried out on a large scale in a Banbury mixer at about 330° F. and the decabromodiphenoxyethane was changed to 22 and 16 parts respectively while the antimony oxide was lowered to 7 and 6 parts respectively, provided closely related blends to those of blends 24 and 26. Test sheets were prepared from the blends according to the method described above. The physical properties were compared directly with those properties of the pure Polyether PU and Polyester PU and are tabulated below.

| | Polyether PU | Polyether PU Blend | Polyester PU | Polyester PU Blend |
|---|---|---|---|---|
| Tensile str. (psi) | 5000 | 3076 | 6500 | 5738 |
| Tensile modulus (psi) | | | | |
| 50% | 640 | 691 | 1225 | 1525 |
| 100% | 750 | 795 | 1550 | 1841 |
| 300% | 1200 | 1120 | 3600 | 3772 |
| Elongation at break (%) | 630 | 650 | 500 | 418 |
| Tensile set, % | 50 | 99 | — | 31 |
| UL 94-M | flaming drip | V-O | flaming drip | V-O |
| Oxygen Index | — | 30.6% | — | 32.8% |

Both blends in accordance with the invention received a V-O non-burning rating whereas the pure polyurethanes both show flaming drip when exposed to flame and both blends had high O.I. values. The loss in properties in the blends was minor compared to the benefits arising from the flame retardancy. The physical properties of the blends are still regarded as very good and characteristic for polyurethanes.

EXAMPLE 4

Five polymer blends were prepared using the procedure described in Example 1 and the ingredients in the proportions by weight set forth in Table IV. Blends 28, 29, and 31 are in accordance with the present invention whereas blends 27 and 30 are for purposes of comparison. The blends were subjected to the torch test also described in Example 1 and observed for molten flaming drip.

Blends 27 and 30 did not contain sufficient quantities of the PVC and NBR components to prevent the molten drip. The blends containing sufficient amounts of the PVC-NBR combination showed no molten drip but rather formed a charred mass.

TABLE IV

| Blend | 27 | 28 | 29 | 30 | 31 |
|---|---|---|---|---|---|
| Ingredients (pts. by wt.): | | | | | |
| Polyether PU | 90 | 80 | 50 | | |
| Polyester PU | | | | 90 | 85 |
| NBR[1] | 5 | 10 | 25 | 5 | 7.5 |
| PVC[2] | 5 | 10 | 25 | 5 | 7.5 |
| Observations | drip | no drip | no drip | drip | no drip |

Footnotes to TABLE IV
[1]NBR is the same NBR as NBR B described in footnote 1 of Table I except that no PVC is present.
[2]PVC is the Dow 7053 described in Example 1.

We claim:
1. A thermoplastic composition comprising a blend of about 50 to about 85 percent by weight of a thermoplastic polyurethane and the balance of the blend comprising (a) a polyvinyl halide resin and (b) a diene-nitrile copolymer, the weight ratio of (a) to (b) being within the range of from about 1:4 to about 1.5:1.

2. A composition according to claim 1 wherein (a) is polyvinyl chloride.

3. A composition according to claim 1 wherein (b) is a polyacrylonitrile/polybutadiene copolymer.

4. A composition according to claim 1 which also comprises a flame retardant additive.

5. A composition according to claim 4 wherein said flame retardant additive comprises in combination antimony oxide and a halogenated aromatic compound.

6. A thermoplastic composition comprising a blend of about 50 to about 85 percent by weight of a thermoplastic polyurethane and the balance of the blend comprising (a) a polyvinyl chloride resin and (b) a polyacrylonitrile/butadiene copolymer, the weight ratio of (a) to (b) being within the range of from about 1:4 to about 1.5:1.

7. A composition according to claim 6 which also comprises an effective amount of a flame retardant combination comprising antimony oxide and a halogenated aromatic compound.

8. A composition according to claim 7 wherein said halogenated compound is a brominated aromatic compound.

9. A composition according to claim 6 wherein said polyurethane is a polyether polyurethane.

10. A composition according to claim 6 wherein said polyurethane is a polyester polyurethane.

11. A composition according to claim 6 containing about 65 to about 85 percent by weight of a thermoplastic polyurethane and the balance comprising (a) polyvinyl chloride and (b) polyacrylonitrile/butadiene copolymer, the weight ratios of (a) to (b) being from about 1:3 to about 1.22:1.

12. A thermoplastic composition comprising a blend of
(A) about 50 to about 65 weight percent of a thermoplastic polyurethane;
(B) about 10 to about 20 weight percent of (a) a polyvinyl chloride resin and (b) a polyacrylonitrile/butadiene copolymer, the weight ratio of (a) to (b) being from about 1:3 to about 1.22:1;
(C) about 5 to about 15 weight percent of antimony oxide;
(D) about 10 to about 20 weight percent of a brominated aromatic compound.

13. A composition according to claim 12 wherein (A) is a polyether polyurethane.

14. A composition according to claim 12 wherein (A) is a polyester polyurethane.

15. A composition according to claim 13 or 14 wherein said brominated aromatic compound is decabromodiphenoxyethane.